US008297856B2

(12) United States Patent
Banal, Jr. et al.

(10) Patent No.: US 8,297,856 B2
(45) Date of Patent: Oct. 30, 2012

(54) ELECTRO-OPTICAL MODULE AND MULTI-FUNCTIONAL LATCH MEMBER THEREFOR

(75) Inventors: Margarito P Banal, Jr., Hong Kong (HK); Francis G Gamboa, Hong Kong (HK); Wai Vincent Hung, Hong Kong (HK)

(73) Assignee: Sae Magnetics (H.K.) Ltd., N.T. (HK)

( * ) Notice: Subject to any disclaimer, the term of this patent is extended or adjusted under 35 U.S.C. 154(b) by 200 days.

(21) Appl. No.: 12/965,932

(22) Filed: Dec. 13, 2010

(65) Prior Publication Data

US 2012/0148202 A1  Jun. 14, 2012

(51) Int. Cl.
*G02B 6/36* (2006.01)

(52) U.S. Cl. .............................. 385/93; 385/135; 385/92

(58) Field of Classification Search ............... 385/90–93, 385/33, 135; 439/329–358
See application file for complete search history.

(56) References Cited

U.S. PATENT DOCUMENTS

| 4,299,433 | A | * | 11/1981 | Jayne | 439/329 |
| 7,285,004 | B1 | * | 10/2007 | Fukuda et al. | 439/358 |
| 7,322,753 | B2 | * | 1/2008 | Mizue et al. | 385/92 |
| 2005/0117854 | A1 | * | 6/2005 | Chiu et al. | 385/92 |
| 2008/0044141 | A1 | | 2/2008 | Willis et al. | |

* cited by examiner

*Primary Examiner* — Ellen Kim

(57) ABSTRACT

An electro-optical module includes an optical lens block, a fiber connector, and a metal latch member adapted to hold the assembly of the optical lens block and the fiber connector together and on a printed circuit board. The latch member includes a metal sheet substantially covering the assembly, depending legs for snap-locking to the printed circuit board, springs at a rear end of the assembly and compress during insertion of the fiber connector, and latching arms with hooks for latching onto two opposite end portions of a front end of the assembly after the insertion and release of the springs.

16 Claims, 4 Drawing Sheets

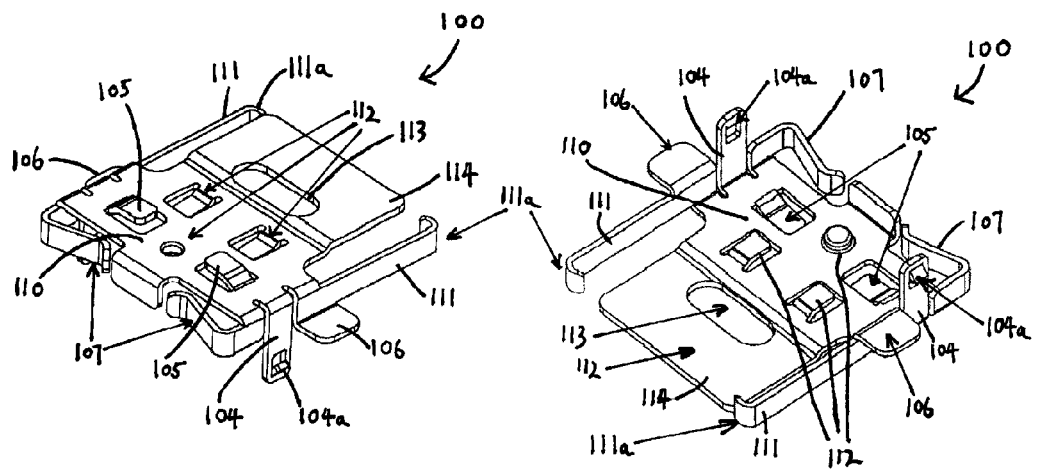
FIG. 3
FIG. 4
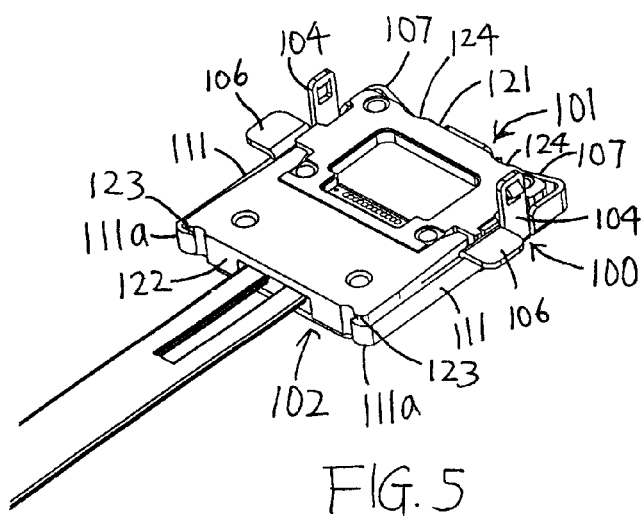
FIG. 5

US 8,297,856 B2

ELECTRO-OPTICAL MODULE AND MULTI-FUNCTIONAL LATCH MEMBER THEREFOR

FIELD OF PATENT APPLICATION

The present application relates to an electro-optical module and a multi-functional latch member for an electro-optical module.

BACKGROUND

Previous mechanical designs for parallel optical transceiver module, in particular for active optical cable module, utilize complicated and multiple mechanical parts to ensure mechanical robustness of the opto-electrical components, heat dissipation from on-board driver/receiver electronics, electromagnetic interference shielding.

There is a need to minimize the mechanical parts in an electronics module and produce a simple mechanical part to address all of these issues associated with the design of the electro-optical module for use in active optical cable.

The above description of the background is provided to aid in understanding an electro-optical module, but is not admitted to describe or constitute pertinent prior art to the electro-optical module disclosed in the present application, or consider any cited documents as material to the patentability of the claims of the present application.

SUMMARY

Although the electro-optical module disclosed in the present application is shown and described with respect to certain embodiments, it is obvious that equivalents and modifications will occur to others skilled in the art upon the reading and understanding of the specification.

According to one aspect, there is provided an electro-optical module including an optical lens block, a fiber connector adapted to connect to the optical lens block and a latch member. The latch member is adapted to hold an assembly of the optical lens block and the fiber connector together and on a printed circuit board. The assembly includes two opposite sides, a front end on the fiber connector and an opposite rear end on the optical lens block. The latch member includes a metal sheet, first and second legs depending downwardly from two opposite sides of the metal sheet, first and second springs extending from the metal sheet, and first and second latching arms extending from the metal sheet and along the two opposite sides of the assembly. The metal sheet is adapted to substantially cover a top surface of the assembly. Each leg includes a snap for snap-lock engagement with the printed circuit board. The first and second springs are adapted to abut against the rear end of the assembly and compress during insertion of the fiber connector to the optical lens block. The first and second latching arms have first and second hooks adapted to latch onto two opposite end portions of the front end of the assembly respectively after the insertion and release of the springs.

In one embodiment, the metal sheet is electrically connected to ground through the first and second legs, thereby forming a shield adapted to prevent electromagnetic interference.

In one embodiment, the metal sheet further includes first and second thermal contacts adapted to contact first and second thermal pads provided on the printed circuit board for heat dissipation.

In one embodiment, the metal sheet further includes a plurality of upwardly bending portions defining a plurality of additional springs for thermally contacting an external housing through a thermal pad for heat dissipation.

In one embodiment, the metal sheet, the first and second legs, the first and second latching arms and the first and second springs together define a protective cage adapted to protect the optical lens block and the fiber connector.

According to another aspect, there is provided a multi-functional latch member adapted to hold an assembly of an optical lens block and a fiber connector together and on a printed circuit board. The assembly includes two opposite sides, a front end on the fiber connector, and an opposite rear end on the optical lens block. The latch member includes a metal sheet; first and second legs depending downwardly from two opposite sides of the metal sheet, a spring extending from the metal sheet and a latching arm extending from the metal sheet. The metal sheet is adapted to substantially cover a top surface of the assembly. Each leg includes a snap for snap-lock engagement with the printed circuit board. The spring is adapted to abut against the rear end of the assembly and compress during insertion of the fiber connector to the optical lens block. The latching arm is adapted to latch onto the front end of the assembly after the insertion and release of the spring.

In one embodiment, the metal sheet is electrically connected to ground through the first and second legs, thereby forming a shield adapted to prevent electromagnetic interference.

In one embodiment, the metal sheet further includes at least one thermal contact adapted to contact at least one thermal pad provided on the printed circuit board for heat dissipation.

In one embodiment, the latch member includes two latching arms extending along the two opposite sides of the assembly and including two hooks adapted to latch onto two opposite end portions of the front end of the assembly respectively.

In one embodiment, the latch member includes a pair of springs abutting against the rear end of the assembly.

In one embodiment, the metal sheet further includes a plurality of downwardly bending portions defining a plurality of lower springs for holding the optical lens block against the printed circuit board.

In one embodiment, the metal sheet further includes at least one upwardly bending portion defining at least one upper spring for thermally contacting an external housing through a thermal pad for heat dissipation.

In one embodiment, each snap is in the form of an outwardly bending portion of the leg adapted to insert through a through slot formed in the printed circuit board and interlock with a bottom surface thereof.

In one embodiment, the metal sheet, the first and second legs, the latching arm and the spring together define a protective cage adapted to protect the optical lens block and the fiber connector.

In one embodiment, the metal sheet is formed with a cut-out portion to which adhesive epoxy is applied for bonding the optical lens block, the fiber connector and the metal sheet together.

In one embodiment, the metal sheet, the first and second legs, the latching arm, and the spring are made from a single piece of metal by stamping and bending.

BRIEF DESCRIPTION OF THE DRAWINGS

Specific embodiments of the electro-optical module disclosed in the present application will now be described by way of example with reference to the accompanying drawings.

FIG. 3 is a top perspective view of the latch member that holds the optical engine and the fiber connector in place, and also serves as an electromagnetic interference shielding and a heat spreader, according to one embodiment disclosed in the present application.

FIG. 4 is a bottom perspective view of the latch member of FIG. 3.

FIG. 5 is a bottom perspective view of an assembled optical engine without the printed circuit board.

DETAILED DESCRIPTION

Figure 1:
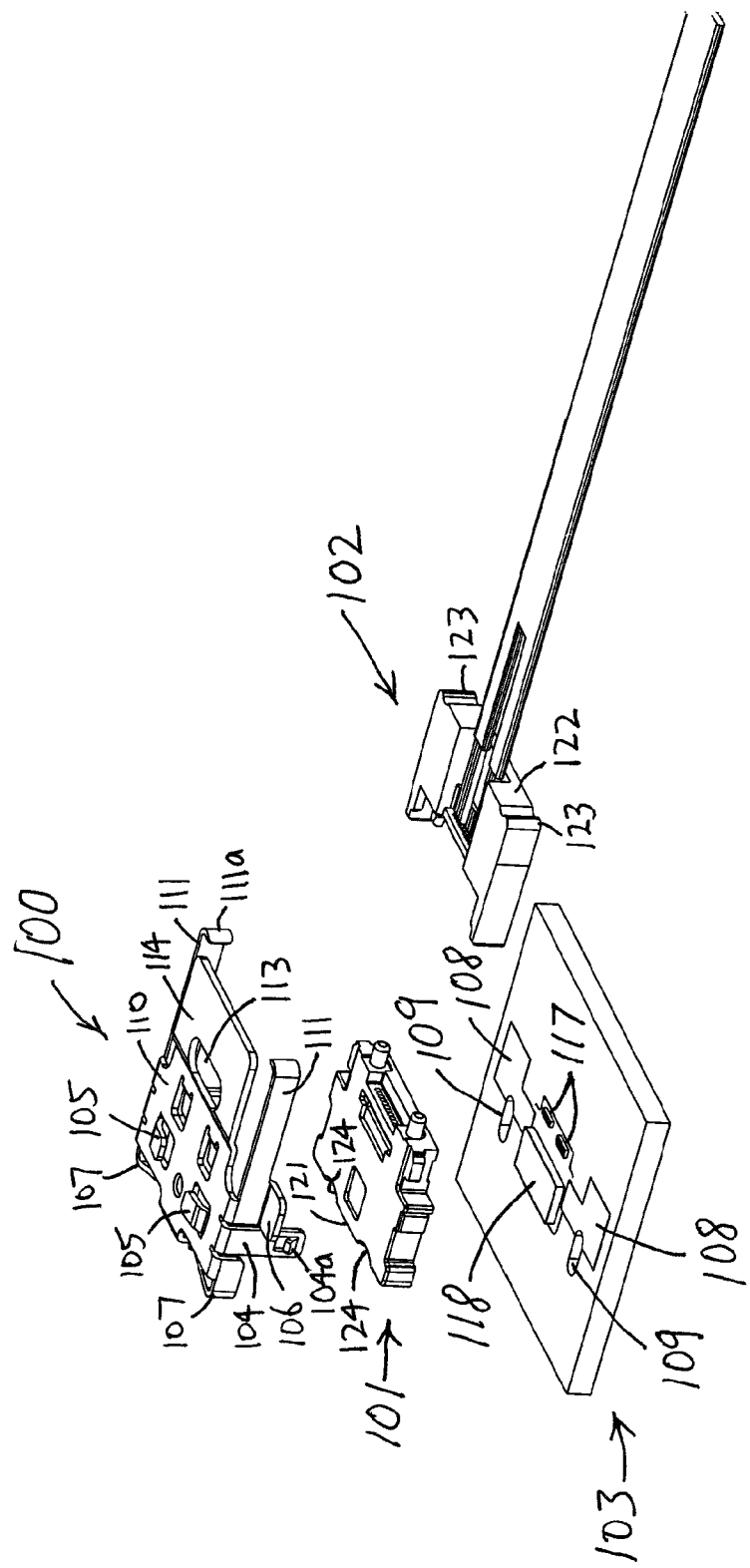
FIG. 1 is a top exploded perspective view of the optical engine according to one embodiment disclosed in the present application.

Reference will now be made in detail to a preferred embodiment of the electro-optical module disclosed in the present application, examples of which are also provided in the following description. Exemplary embodiments of the electro-optical module disclosed in the present application are described in detail, although it will be apparent to those skilled in the relevant art that some features that are not particularly important to an understanding of the electro-optical module may not be shown for the sake of clarity.

Furthermore, it should be understood that the electro-optical module disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the appended claims.

Certain terminology is used in the following description for convenience only and is not limiting. The words "front", "rear", "upward", "downward", "outward", "inward", "top", and "bottom" designate directions in the drawings to which reference is made. The terminology includes the words noted above as well as derivatives thereof and words of similar import.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element, or is in mechanical or electrical communication with another element.

Figure 2:
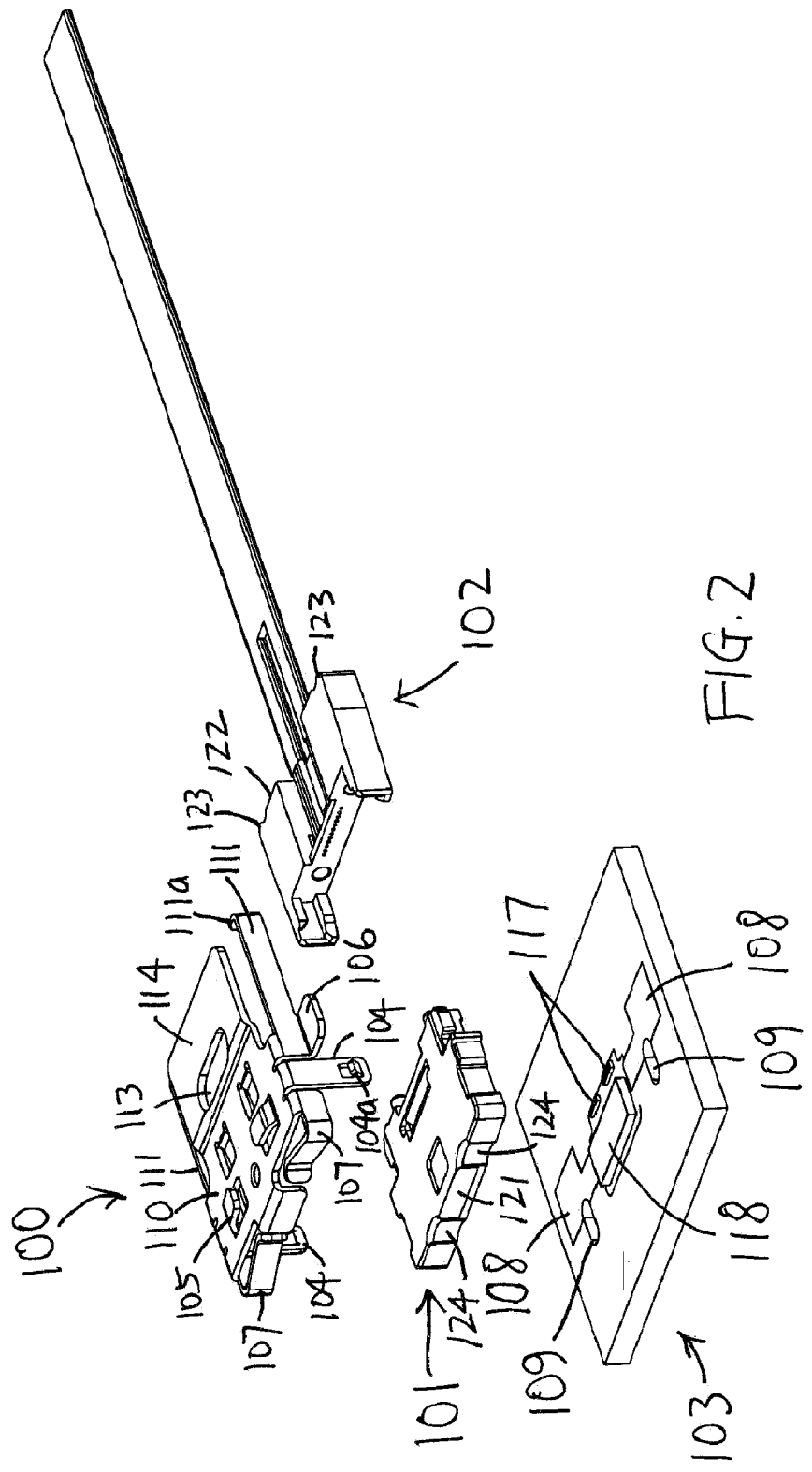
FIG. 2 is a bottom exploded perspective view of the optical engine of FIG. 1.

FIGS. 1 and 2 are exploded views of an optical engine according to an embodiment disclosed in the present application. The optical engine may include a multi-functional latch member 100, an optical lens block 101, a fiber plug or connector 102, and a printed circuit board 103 on which active optical chips 117 and driving electronic integrated circuit 118 are mounted. The optical chips 117 may include laser source and photo diodes in either singlet or array form. The driving electronic integrated circuit 118 can be electrically connected to the optical chips 117 and can serve the purpose of interfacing the optical chips 117 with external high-speed electrical system. Both the integrated circuit 118 and the optical chips 117 can be bonded onto the printed circuit board 103 using wire-bonding process, or flip-chip process, or any other suitable process.

The optical lens block 101 may be made of optically transparent material and may serve the purpose of coupling light between the optical chips 117 and the fibers in the fiber connector 102. The optical lens block 101 may be bonded onto the printed circuit board 103. Good alignment between the lens surfaces in the optical lens block 101 with the active areas of the optical chips 117 is required to maximize light coupling between the optical chips 117 and the fibers. The latch member 100 can be inserted from the top and hold the optical lens block 101 onto the printed circuit board 103. The fiber connector 102 containing an array of optic fibers is then inserted to mate with the optical lens block 101.

FIGS. 3 and 4 depict an embodiment of the latch member 100 according to an embodiment disclosed in the present application. The latch member 100 can be used to hold the optical lens block 101 and the fiber connector 102 together and on the printed circuit board 103. The latch member 100 may be made of thermally and electrically conductive metal. Furthermore, the latch member 100 can be made from a single piece of metal by conventional metal stamping and bending processes.

The latch member 100 may include a generally planar metal sheet 110. The metal sheet 110, including a front extension portion 114, can be adapted to substantially cover the top surfaces of the optical lens block 101 and the fiber connector 102. The detailed structures of the metal sheet 110 will be described later.

The latch member 100 may include a pair of legs 104. The pair of legs 104 may depend downwardly from two opposite sides of the metal sheet 110 respectively. Each leg 104 may be formed with a snap 104a for snap-locking to the printed circuit board 103. According to the illustrated embodiment, each snap 104a can be formed by stamping a portion of the free end of the leg 104 to form an outwardly bending portion. Each snap 104a can be inserted through a through slot 109 formed on the printed circuit board 103. Each outwardly bending portion can act as a barb and interlock on the bottom side of the printed circuit board 103 thereby snapping and locking the latch member 100 onto the printed circuit board 103.

Once snapped, the latch member 100 can be brought into contact with the top surface of the optical lens block 101 at a number of contact points defined by a plurality of springs 112. The plurality of springs 112 may be formed by stamping the metal sheet 110 to form a plurality of downwardly bending portions. The springs 112 can help to secure the optical lens block 101 in place and add robustness to the assembly. The direction and orientation of the springs 112 may allow the contact points to slide on the top surface of the optical lens block 101. This can prevent the latch member 100 from applying shear or lifting force to the optical lens block 101, and can eliminate the possibility of de-lamination of the optical lens block 101 during insertion of the fiber connector 102. The length of the through slots 109 on the printed circuit board 103 may be designed to allow the snaps 104a to glide horizontally during the insertion of the fiber connector 102.

FIG. 5 shows the assembly of the optical lens block 101 and the fiber connector 102. The assembly 101, 102 may have two opposite sides, a front end 122 on the fiber connector 102 and a rear end 121 on the optical lens block 101. Apart from holding the assembly 101, 102 on the printed circuit board 103, the latch member 100 can also hold the assembly of the optical lens block 101 and the fiber connector 102 together.

To hold the assembly 101, 102 together, the latch member 100 may further include one or more springs 107. According to the illustrated embodiment, a pair of springs 107 may extend from the metal sheet 110. The pair of springs 107 is adapted to abut against two recesses 124 formed on the rear end 121 on the optical lens block 102 respectively. The springs 107 and can be compressed during insertion of the fiber connector 102 to the optical lens block 101. After insertion, the springs 107 can be released.

Furthermore, one or more latching arms 111 may be formed on the latch member 100. According to the illustrated embodiment, two latching arms 111 may extend from the metal sheet 110 and along the two opposite sides of the assembly of the optical lens block 101 and fiber connector 102. Two hooks 111a can be formed at the ends of the two latching arms 111 for latching onto two opposite end portions 123 of the front end 122 on the fiber connector 102 respectively. The hooks 111a can prevent the assembly 101, 102 from being de-latched.

When the fiber connector 102 is inserted to the optical lens block 101, the springs 107 are compressed. After insertion is completed, the springs 107 can be released and the hooks 111a of the latching arms 111 can latch onto the front end 122 of the fiber connector 102, thereby holding the assembled optical lens block 101 and fiber connector 102 together.

After latching, the front extension portion 114 of the latch member 100 can limit upward tilting of the fiber connector 102 being connected to the optical lens block 101. To further enhance the robustness of the connection, adhesive epoxy may be applied in a cut-out portion 113 formed on the front extension portion 114 of the latch member 100. The adhesive epoxy can bond the fiber connector 102, the optical lens block 101 and the latch member 100 together.

Figure 6:
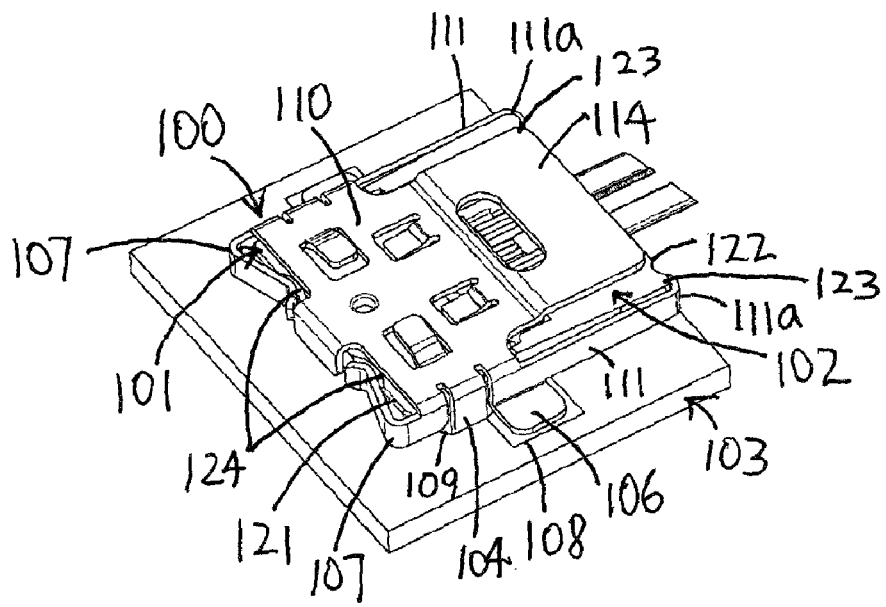
FIG. 6 is a top perspective view of an assembled optical engine device.

FIG. 6 is a top perspective view of an assembled optical engine device. The design of the latch member 100 may enable good mechanical support inside the module. The latch member 100 can be configured to enable secure latching of the assembly of the optical lens block 101 and the fiber connector 102. At the same time, the same piece of metal can also secure the assembled optical lens block 101 and fiber connector 102 onto the printed circuit board 103 so that these high-precision components can withstand severe vibration, tilting, unintentional drop, heat expansion and part tolerance without degradation to optical and high-speed electronic performance.

Apart from connectivity and precision, heat dissipation is another major concern in small electro-optical devices. Although recent advances in IC design and semi-conductor processes have considerably lowered the power consumption of electro-optical ICs, the ever-increasing data rate and the number of parallel channels still make dissipating heat from the IC a major task. Without proper spreading and dissipation of heat, performance will be degraded whereas the operation life time will be considerably shortened.

Figure 7:
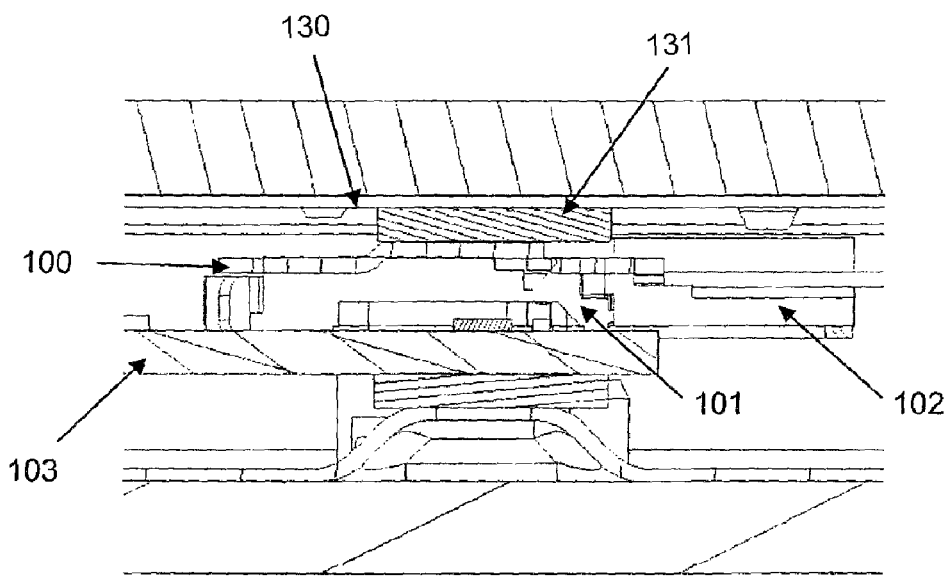
FIG. 7 is a cross sectional view of the optical device mounted inside an external housing according one embodiment disclosed in the present application.

The latch member 100 of the present application can also serve as a heat spreader. The latch member 100 may be made of thermally conductive metal sheet which can be thermally connected to the printed circuit board 103 on which the ICs are mounted. It takes the heat generated by the ICs from the printed circuit board 103. The heat can then be spread and dissipated to an external housing 130, as illustrated in FIG. 7.

The printed circuit board 103 may be provided with thermal pads 108 which can be connected to metal traces near the integrated circuit 118 in such a way that the heat generated by the integrated circuit 118 can be brought to the thermal pads 108 with high efficiency. When the latch member 100 is snapped onto the printed circuit board 103, its thermal contacts 106 can be brought into contact with the thermal pads 108. To improve thermal conduction efficiency, thermal conductive compound may be applied between the thermal contacts 106 and the thermal pads 108.

During operation, heat generated by the integrated circuit 118 can be spread through the thermal contacts 106 and thermal pads 108 to the entire body of the latch member 100. Through one or more additional springs 105 at the top side of the metal sheet 110, the latch member 100 can be brought in thermal contact with the external housing 130 through a thermal pad 131 that helps the dissipation of heat. The springs 105 can be in the form of upwardly bending portions of the metal sheet 110 formed by stamping. In addition to the issue of heat dissipation, electromagnetic interference is another disturbance that affects an electrical circuit due to either electromagnetic conduction or electromagnetic radiation emitted from an external source. The disturbance may interrupt, obstruct, or otherwise degrade or limit the effective performance of the circuit. Without proper shielding, high-speed electro-optical components can interfere with neighboring devices while it may also be affected by other devices surrounding it.

The latch member 100 of the present application can also serve the purpose of electromagnetic interference shielding for the electro-optical components within the module. The latch member 100 can be fabricated using conductive metal sheet which can fit around the module under protection and can be electrically connected to ground through the legs 104.

To achieve the electromagnetic interference shielding function, the entire latch member 100 may be made of electrically conductive material, preferably, metal with high electrical conductivity. By electrically connecting the latch member 100 to ground, a shield can be formed around the electro-optical module, thereby preventing electromagnetic interference from being emitted to interfere neighboring components or vice versa. The electrical connectivity between the latch member 100 and the ground can be implemented at areas in which the snaps 104a of the legs 104 contact the printed circuit board 103.

In summary, most of the current products in the market are solving the issues of electromagnetic interference, robustness of the product and maintaining operating temperature of the electronic device by using multiple components. The latch member 100, acting as a shield, may serve to solve three main problems/issues of the electro-optical device. It can wrap around the optical engine to serve as electromagnetic interference shield in the electro-optical module. It can also serve to dissipate heat and transfer heat to the entire housing of the module to cool down the entire module. The printed circuit board 103 can be provided with thermally conductive traces near the IC and run towards the outside of the module to connect and transfer heat to the metal shield 100.

The latch member 100 disclosed in the present application can also serve as a protective cage for protecting the optical lens block 101, the fiber connector 102 and the ICs mounted on the printed circuit board 103.

The device disclosed in the present application represents a technology differentiator that gives one a competitive advantage in the market by utilizing a single latch member 100 for multiple functions.

It is appreciated that in the market there's a high demand of having a smaller electro-optical transmitting and receiving device to be integrated in multiple products. Since it is able to integrate the three main useful functions of the electro-optical device in one single latch member 100, the effect is that the size of the electro-optical device can be smaller and the cost of the electro-optical product can be reduced while maintaining an excellent functional and robust electro-optical device.

While the electro-optical module disclosed in the present application has been shown and described with particular references to a number of preferred embodiments thereof, it should be noted that various other changes or modifications may be made without departing from the scope of the appending claims.

What is claimed is:

1. An electro-optical module comprising:
    an optical lens block;
    a fiber connector adapted to connect to the optical lens block; and
    a latch member adapted to hold an assembly of the optical lens block and the fiber connector together and on a printed circuit board, the assembly comprising two opposite sides, a front end on the fiber connector, and an opposite rear end on the optical lens block, the latch member comprising:
        a metal sheet adapted to substantially cover a top surface of the assembly;
        first and second legs depending downwardly from two opposite sides of the metal sheet, each leg comprising a snap for snap-lock engagement with the printed circuit board;
        first and second springs extending from the metal sheet, and adapted to abut against the rear end of the assembly and compress during insertion of the fiber connector to the optical lens block; and
        first and second latching arms extending from the metal sheet and along the two opposite sides of the assembly, and have first and second hooks adapted to latch onto two opposite end portions of the front end of the assembly respectively after the insertion and release of the springs.

2. The latch member as claimed in claim 1, wherein the metal sheet is electrically connected to ground through the first and second legs, thereby forming a shield adapted to prevent electromagnetic interference.

3. The latch member as claimed in claim 1, wherein the metal sheet further comprises first and second thermal contacts adapted to contact first and second thermal pads provided on the printed circuit board for heat dissipation.

4. The latch member as claimed in claim 1, wherein the metal sheet further comprises a plurality of upwardly bending portions defining a plurality of additional springs for thermally contacting an external housing through a thermal pad for heat dissipation.

5. The latch member as claimed in claim 1, wherein the metal sheet, the first and second legs, the first and second latching arms and the first and second springs together define a protective cage adapted to protect the optical lens block and the fiber connector.

6. A multi-functional latch member adapted to hold an assembly of an optical lens block and a fiber connector together and on a printed circuit board, the assembly comprising two opposite sides, a front end on the fiber connector, and an opposite rear end on the optical lens block, the latch member comprising:
    a metal sheet adapted to substantially cover a top surface of the assembly;
    first and second legs depending downwardly from two opposite sides of the metal sheet, each leg comprising a snap for snap-lock engagement with the printed circuit board;
    a spring extending from the metal sheet, and adapted to abut against the rear end of the assembly and compress during insertion of the fiber connector to the optical lens block; and
    a latching arm extending from the metal sheet and adapted to latch onto the front end of the assembly after the insertion and release of the spring.

7. The latch member as claimed in claim 6, wherein the metal sheet is electrically connected to ground through the first and second legs, thereby forming a shield adapted to prevent electromagnetic interference.

8. The latch member as claimed in claim 6, wherein the metal sheet further comprises at least one thermal contact adapted to contact at least one thermal pad provided on the printed circuit board for heat dissipation.

9. The latch member as claimed in claim 6, comprising two latching arms extending along the two opposite sides of the assembly and comprising two hooks adapted to latch onto two opposite end portions of the front end of the assembly respectively.

10. The latch member as claimed in claim 6, comprising a pair of springs abutting against the rear end of the assembly.

11. The latch member as claimed in claim 6, wherein the metal sheet further comprises a plurality of downwardly bending portions defining a plurality of lower springs for holding the optical lens block against the printed circuit board.

12. The latch member as claimed in claim 6, wherein the metal sheet further comprises at least one upwardly bending portion defining at least one upper spring for thermally contacting an external housing through a thermal pad for heat dissipation.

13. The latch member as claimed in claim 6, wherein each snap is in the form of an outwardly bending portion of the leg adapted to insert through a through slot formed in the printed circuit board and interlock with a bottom surface thereof.

14. The latch member as claimed in claim 6, wherein the metal sheet, the first and second legs, the latching arm and the spring together define a protective cage adapted to protect the optical lens block and the fiber connector.

15. The latch member as claimed in claim 6, wherein the metal sheet is formed with a cut-out portion to which adhesive epoxy is applied for bonding the optical lens block, the fiber connector and the metal sheet together.

16. The latch member as claimed in claim 6, wherein the metal sheet, the first and second legs, the latching arm, and the spring are made from a single piece of metal by stamping and bending.

* * * * *